(12) United States Patent
Wang et al.

(10) Patent No.: US 6,961,108 B2
(45) Date of Patent: Nov. 1, 2005

(54) LIQUID CRYSTAL DISPLAY VIEWABLE UNDER ALL LIGHTING CONDITIONS

(76) Inventors: Ran-Hong Raymond Wang, 3 Ensueno East, Irvine, CA (US) 92620; Min-Shine C. Wang, 3 Ensueno East, Irvine, CA (US) 92620

( * ) Notice: Subject to any disclaimer, the term of this patent is extended or adjusted under 35 U.S.C. 154(b) by 0 days.

(21) Appl. No.: 10/892,867

(22) Filed: Jul. 16, 2004

(65) Prior Publication Data

US 2004/0263720 A1 Dec. 30, 2004

Related U.S. Application Data

(62) Division of application No. 10/370,360, filed on Feb. 18, 2003.

(51) Int. Cl.[7] .......................................... G02F 1/1335
(52) U.S. Cl. ...................................... 349/137; 349/96
(58) Field of Search ............................ 349/114, 137

(56) References Cited

U.S. PATENT DOCUMENTS

| 6,456,346 B1 | 9/2002 | Arai | 349/106 |
| 6,717,641 B2 | 4/2004 | Arai | 349/114 |

*Primary Examiner*—James A. Dudek
(74) *Attorney, Agent, or Firm*—Wu & Cheung, LLP; Charles C. H. Wu

(57) ABSTRACT

A liquid crystal display (LCD) viewable under all lighting conditions without excessive power consumption is described. The LCD comprises a first dichroic polarizer, a second dichroic polarizer, an anti-reflection layer positioned in front of the first dichroic polarizer and a liquid crystal cell positioned between the first dichroic polarizer and the second dichroic polarizer. In addition, the LCD comprises a backlight assembly positioned behind the second dichroic polarizer. Finally, the LCD comprises a diffusing transflector positioned between the backlight assembly and the second dichroic polarizer. The diffusing transflector comprises a diffusing element and a transflective element.

6 Claims, 13 Drawing Sheets

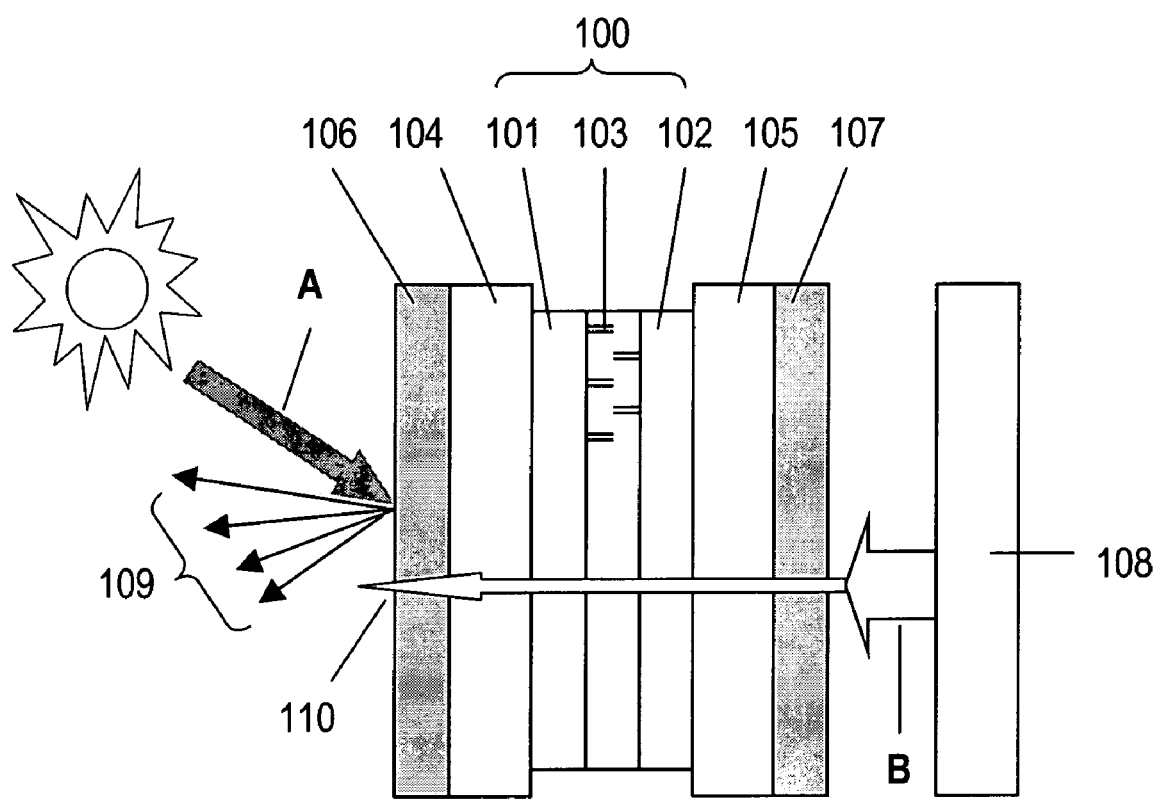
Fig. 1 (related arts)

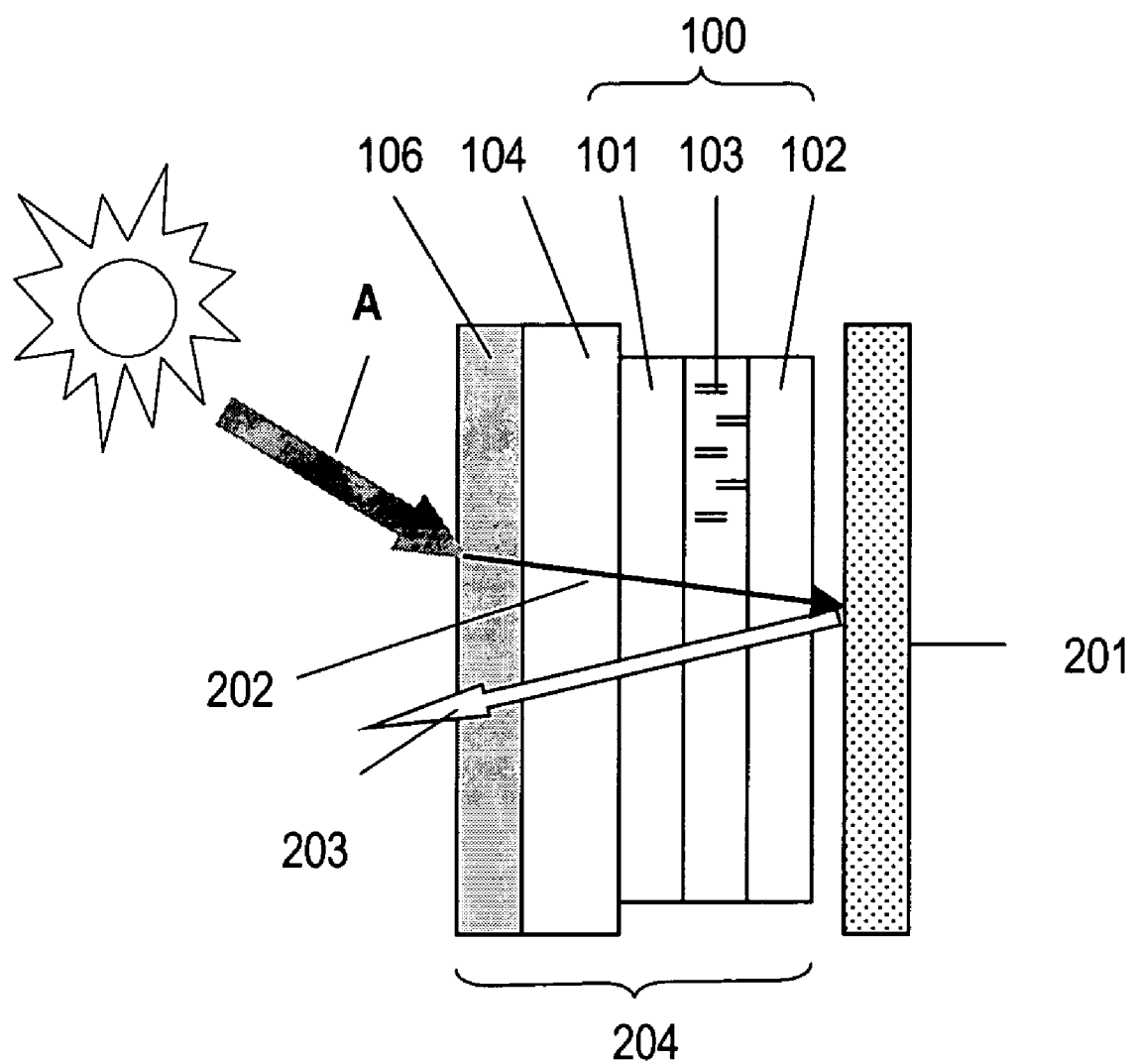
Fig. 2 (related arts)

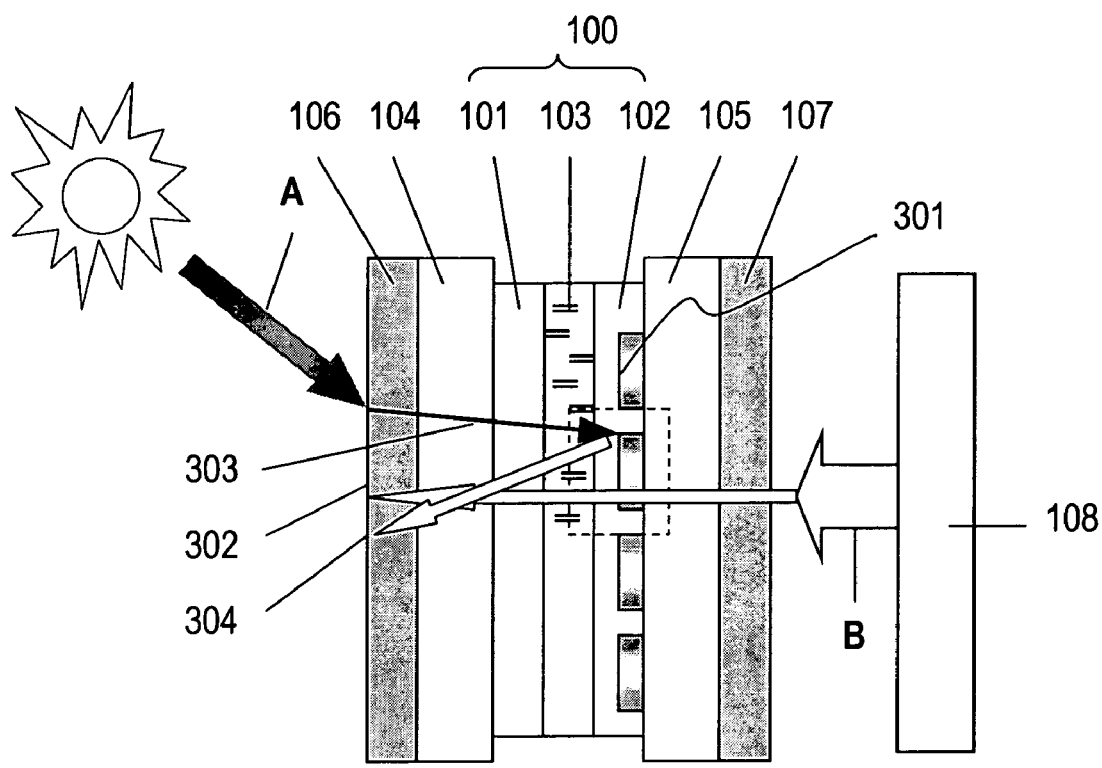
Fig. 3a (related arts)
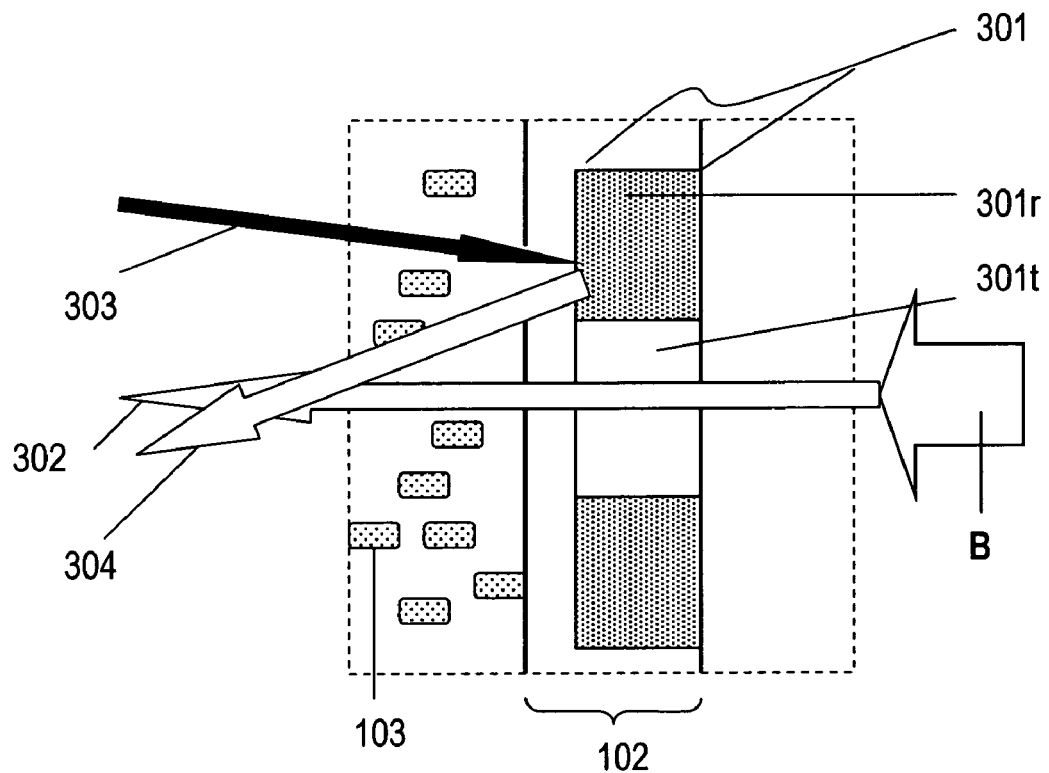
Fig. 3b (related arts)

ical display viewable under all lighting conditions, such
LIQUID CRYSTAL DISPLAY VIEWABLE UNDER ALL LIGHTING CONDITIONS This application is a divisional of copending application Ser. No. 10/370,360 filed on Feb. 18, 2003.

BACKGROUND OF THE INVENTION

1. Field of the Invention

This invention relates to a liquid crystal display device, and more particularly, to an improved transflective liquid crystal display viewable under all lighting conditions, such as total dark, indoor lighting, in shade, medium sunlight, strong sunlight, and direct sunlight, without excessive power consumption.

2. Description of the Related Art

Many features of liquid crystal displays (LCDs), such as light weight and size, low power consumption and high resolution, make LCDs a popular choice in various electronic applications. These applications include digital cameras, palm PCs, notebook computers, tablet PCs, workstations, and navigation systems in automobiles, marine vessels, and airplanes. Most of these applications are portable and can be transited between indoor and outdoor. Thus, there is a need to develop a display to accommodate both indoor and outdoor environments and perform regardless of different lighting conditions. Various types of LCDs have evolved around this need.

With reference to FIG. 1, a conventional transmissive liquid crystal display (LCD) is shown. The LCD includes a liquid crystal cell 100 comprising a front transparent electrode with color filters 101, a rear transparent electrode (pixel portions) 102, and a layer of liquid crystals 103 between the front and rear transparent electrodes. The liquid crystal cell 100 is usually sandwiched by a front glass substrate 104 and a rear glass substrate 105. A first dichroic polarizer 106 adheres to the front surface of the front glass 104. Likewise, a rear dichroic polarizer 107 adheres to the rear surface of the rear glass 105. The transmissive display further includes a backlight cell assembly 108. A regular LCD contains 1 to 4 lamps that provide between 100 and 300 nits of illumination 110 at the surface of LCD. This level of brightness enables this type of LCD to perform beautifully indoors. In an outdoor setting, the anti-glare surface of the first polarizer 106 reflects and diffuses about 3% to 5% of the ambient sunlight A to a viewer's eyes. The amount of background reflection 109 is strong, overwhelming the illumination 110 from the backlight 108 and obscuring the image generated by the LCD.

One approach used to improve the performance of this type of LCD under sunlight is to apply an anti-reflection coating on the front surface. Although providing some improvement, the anti-reflection coating alone is not sufficient to provide an LCD viewable under direct sunlight. Further improvement is necessary.

Another solution commonly adopted is to increase the illumination of transmissive LCDs for outdoor application by adding more lamps to the backlight cell. The term "high-bright LCD" describes this modified transmissive LCD. In general, an LCD requires at least 1000 nits of illumination to be viewable under sunlight. To reach this level of brightness, an LCD requires 10 to 12 lamps. The additional lamps consume more power, generate excessive heat, experience contrast washout and require dimension and circuit alterations. Alterations of the LCD's dimensions and circuits are costly. Thus, high bright LCDs generally create more problems than they solve.

Referring now to FIG. 2, a common construction of a reflective LCD is shown. A reflective LCD does not have problems with power consumption since ambient light A is used for illumination. A reflector 201 is positioned behind a liquid crystal display assembly 204. Generally, the reflector 201 is an opaque surface of highly reflective material (such as aluminum or silver) with 90% to 98% reflection. The LCD display assembly 204 may also contain a second dichroic polarizer (not shown). A portion of ambient light 202 passes the liquid crystal display assembly and reaches the reflective surface of reflector 201. The reflector 201 reflects ambient light portion 202 and uses it as the display's illumination 203. Because the display's illumination is tied to the amount of ambient light provided, the visibility of reflective LCD is highly surrounding-sensitive. Under strong ambient light, the LCD has good illumination. However, LCD brightness diminishes as ambient light decreases. This disadvantage of the reflective LCD strongly limits its applications.

With reference to FIGS. 3A and 3B, a "transflective LCD" is shown. The transflective LCD was developed to overcome the shortcomings of the reflective LCD. A major element of the transflective LCD is the "transflector", which is partially transmissive and partially reflective. The transflector uses ambient light and/or a backlight to illuminate the LCD. One type of transflective LCD implements the transflector as a series of electrodes 301, where the electrodes 301 are imbedded within the compartment of pixel portions 102 of the liquid crystal cell 100. FIG. 3A shows the structure of a transflective LCD with transflective electrodes 301. In FIG. 3B, the cropped partial area of the pixel portions 102 with transflective electrodes 301 is shown. The transflective electrodes 301 have highly reflective regions 301r and transmissive portions 301t contacting the transparent electrodes of pixel portions 102. When ambient light A is not strong, the transmissive portions 301t allow the transmission of light B from backlight cell 108 as the illumination 302 of LCD. When ambient light A is strong, the reflective portions 301r reflect ambient light 303 entering the liquid crystal panel 100, and send it back out as illumination 304 of LCD.

Still referring to FIGS. 3A and 3B, the visibility of the LCD is excellent when the ambient light A is strong. However, the combination of reflective portions 301r and transmissive portions 301t within the same domain (pixel portions 102) imposes undesirable features on the LCD. The problems are more noticeable when the LCD is used indoors, and include low brightness, loss of color, low contrast and a narrow viewing angle. In addition, pixel size of the LCD is limited by the need to accommodate both transmissive and reflective electrodes. The limited pixel size results in increased manufacturing difficulties and costs for higher resolutions.

Another type of transflective LCD comprises a transflective plastic film as the transflector, positioned in the rear of liquid crystal panel (not shown). Although easy to construct, this type of transflective LCD has inefficient illumination. The commonly used transflective films normally have 20% to 40% transmission efficiency and 50% to 70% reflection efficiency. Thus, this type of transflective LCD is not as bright as either purely reflective or purely transmissive LCD types.

In summary, a regular liquid crystal display can have satisfactory performance either indoors or outdoors. A high bright LCD, though acceptable for both indoor and outdoor applications, consumes high power and demands various complimentary re-designs of the device system to accommodate the excessive heat. Reflective LCDs do not perform well indoors. Transflective LCDs are limited by pixel size and do not perform optimally under certain ambient light. Thus, there is a great need to develop a liquid crystal display assembly that consumes low power without excessive heat generation, and has good color, adequate brightness and sufficient contrast under all lighting conditions.

SUMMARY OF THE INVENTION

Accordingly, one object of the invention is to provide a liquid crystal display with good color, adequate brightness and sufficient contrast for outdoor applications.

A second object of the invention is to provide a liquid crystal display with good color, adequate brightness and sufficient contrast for indoor applications.

A third object of the invention is to provide a liquid crystal display that is viewable in direct sunlight with no alteration of the viewing angle.

A fourth object of the invention is to provide a liquid crystal display that is viewable under direct sunlight and does not consume high power to cause excessive heat generation.

To achieve these and other advantages and in accordance with the purpose of the invention, as embodied and broadly described herein, the invention provides a liquid crystal display viewable under all lighting conditions without excessive power consumption. The LCD comprises a first dichroic polarizer, a second dichroic polarizer, an anti-reflection layer positioned in front of the first dichroic polarizer and a liquid crystal panel positioned between the first dichroic polarizer and the second dichroic polarizer. In addition, the LCD comprises a backlight assembly positioned behind the second dichroic polarizer. Finally, the LCD comprises a diffusing transflector positioned between the backlight assembly and the second dichroic polarizer. The diffusing transflector comprises a selective diffusing element and a selective transflective element.

BRIEF DESCRIPTION OF THE DRAWINGS

FIG. 1 is a diagram of the structure of a conventional transmissive liquid crystal display (related art).

FIG. 2 is a diagram of a common structure of a reflective LCD (related art).

FIG. 3a is a diagram of the structure of a transflective LCD with transflective electrodes (related art).

FIG. 3b is a diagram of an enlarged cropped section of the pixel portions containing the transflective electrodes of FIG. 3a (related art).

DESCRIPTION OF THE PREFERRED EMBODIMENTS

Figure 4:
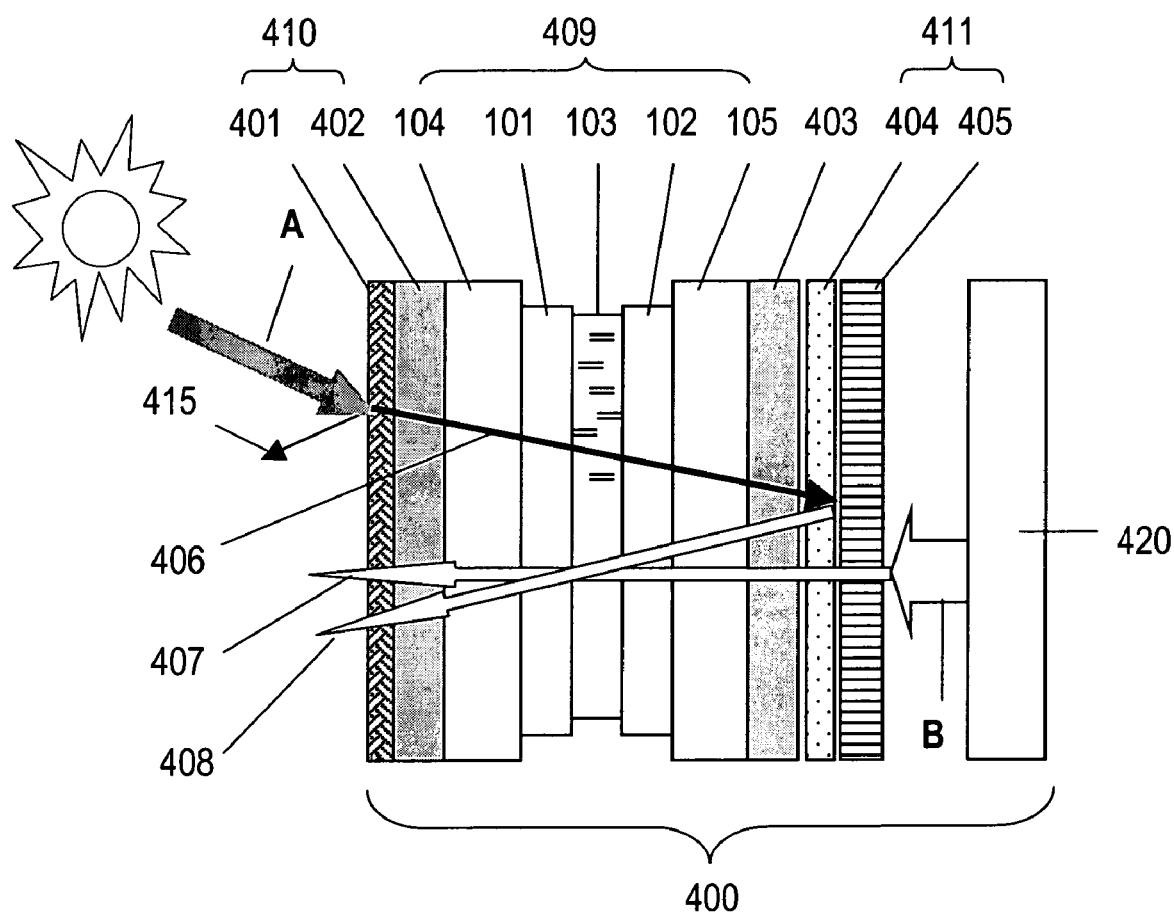
FIG. 4 is a diagram of one embodiment of the present invention.

Referring now to FIG. 4, an illustration of one embodiment of the present invention is shown. Transflective LCD 400 includes a conventional liquid crystal display panel 409. The transflective LCD 400 also includes a low reflection first polarizer 410. The rear side of low reflection first polarizer 410 is bonded to the front side of LCD panel 409 using optical bonding material. The low reflection first polarizer 410 is composed of an anti-reflection (AR) layer 401 and a dichroic polarizer 402. The anti-reflection layer 401 can be a high efficiency multi-layer anti-reflection coating applied directly on the front surface of the dichroic polarizer 402. The anti-reflection layer 401 can also be a separate transmissive substrate, glass or plastic, with an AR coating on the front side. The rear side of the transmissive substrate is bonded to the front side of dichroic polarizer 402 with an index-matched optical bonding material to lower the reflection. The low reflection front surface 401 preferably is a low haze surface (less than 15% haze, haze being the surface scattering luminescence over the luminescence of an object) with high efficient multi-layer AR coating, which provides an anti-reflection surface with reflection less than 1%. The low reflection front surface 401 produces less background reflection 415 than the regular LCD front surface 106 described in FIG. 1 (by 5 to 8 folds). In addition, the low reflection surface 401 allows more efficient transmission of ambient light A and provides a stronger light beam 406 to be used as the reflective illumination 408. The transflective LCD 400 also includes a second dichroic polarizer 403 optically bonded to the rear of liquid crystal panel 409. In this embodiment, the transmission directions of the two dichroic polarizers 402 and 403 are preferably in parallel. Such an arrangement of 402 and 403 provides a transflective LCD that is direct sunlight readable without backlight. However, the transmission directions of 402 and 403 can also vary from 0 to 90 degrees. It is also preferred that AR coating is applied to the rear surface of the second dichroic polarizer 403 (not shown). The AR coating maximizes entry of light beam 406 for reflective illumination.

Still referring to FIG. 4, the transflective LCD 400 further comprises a diffusing transflector 411 positioned to the rear side of second dichroic polarizer 403. The diffusing transflector 411 comprises a diffusing element 404 and a selected reflective polarizer 405. The reflective polarizer 405 preferably has absorption of incident energy less than 10%. The reflective polarizer also has an extinction coefficient, defined as the transmission of p state polarization over the transmission of s state polarization, ranging from 1.5 to 9. In addition, the transmission axis of the reflective polarizer 405 is parallel to or within (+/−) 60 degrees of the transmission direction of the second dichroic polarizer 403. Reflective polarizer 405 can be formed with multiple sheets of a selective reflective polarizer with optimized transmission directions. Reflective polarizer 405 can also be a diffuser laminated selective reflective polarizer, which has improved mechanical and thermal properties.

With reference to FIG. 4, the diffusing element 404 also has a corrugated diffusing surface with haze in the range of 10% to 85%. The corrugated surface can be a roughened surface on a transmissive polymeric substrate, such as PEN (polyethylene naphthalate), PC (polycarbonate), or PET (polyethylene erephthalate). The corrugated surface also can be a dielectric material, such as TiO2 (Titanium dioxide), Ta2O5 (Tantalum oxide), SiO2 (Silicon dioxide), SiN (Silicon nitride), ITO (Indium tin oxide), ZnS (Zinc sulphide), Al2O3 (Aluminum oxide), LaF3 (Lanthanum fluoride), MgF2 (Magnesium fluoride), Ge (Germanium) or Si (Silicon) deposited on a transmissive substrate. The corrugated surface can further be small metal particles, ranging in size from 10 nm to 10000 nm, deposited directly on the rear side of the second polarizer or on a separate transmissive substrate. Choices of metal include silver, gold, aluminum, copper, titanium, tantalum, chromium, nickel or an alloy thereof. One or more sheets of lose-packed or optically bonded transmissive substrate with the corrugated surface can make up the diffusing element 404. In addition, diffusing element 404 can be optically bonded to the rear surface of the second dichroic polarizer 403 and to the front surface of the reflective polarizer 405.

Still referring to FIG. 4, the transflective LCD 400 further includes a high efficiency backlight cell assembly 420. Backlight assembly 420 preferably contains one or two orthogonal sheets of brightness enhancement films and other multiple polymeric films for enhancing transmission and optical performances. However, any conventional backlight cell or high bright backlight cell with edge lamps or backside lamps can be used.

With reference to FIG. 4, the transflective LCD 400 has a maximized transmission 407 with backlight transmitted by a recovery effect from the reflective polarizer 405 and the backlight cell 420. This transmission illumination coupled with the incorporation of the low reflection front surface 401 creates good optical performance for all indoor and some outdoor conditions, such as outdoor in shade. In addition, diffusing transflector 411 optimizes the total reflective illumination 408. A diffusing element with a corrugated surface to randomize light input further optimizes the reflection efficiency of the transflector, thus providing sufficient reflective illumination.

Figure 5:
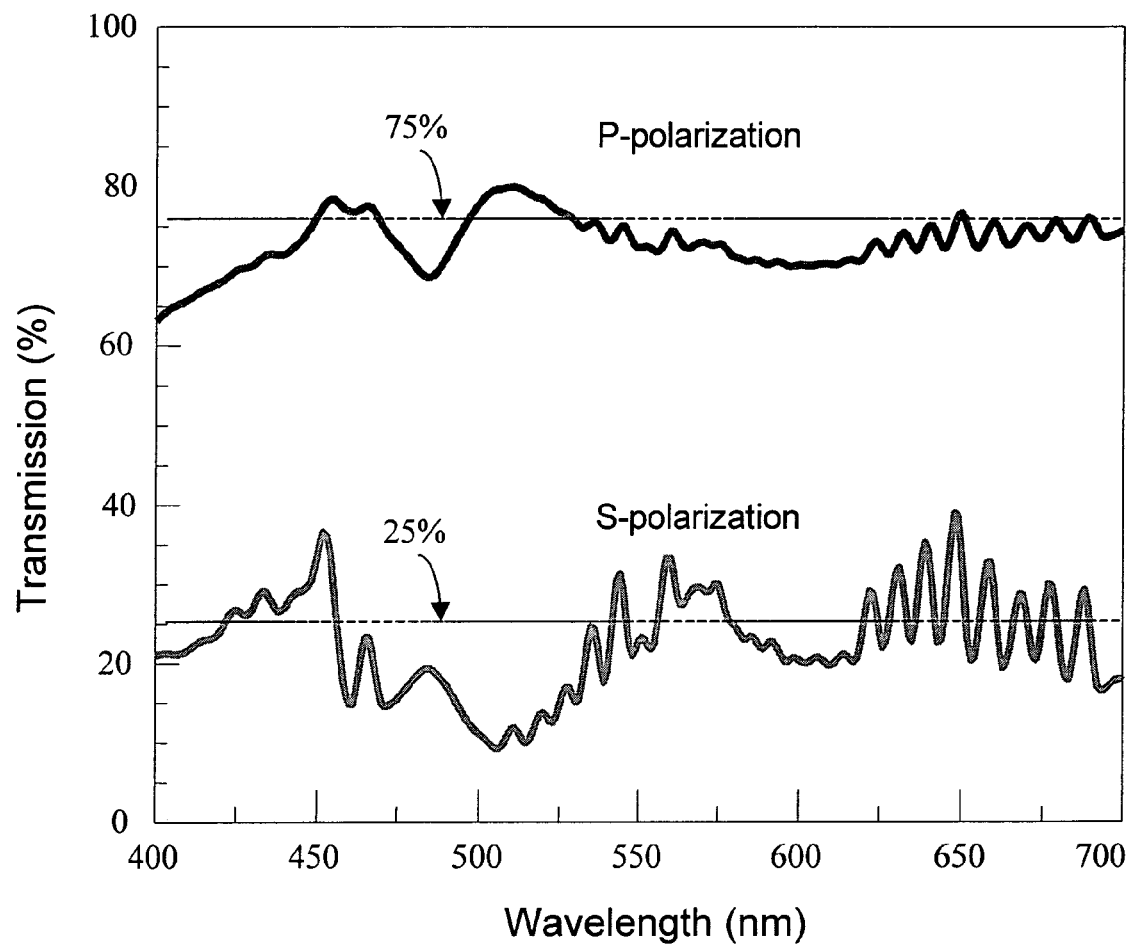
FIG. 5 is a diagram of the spectrum measurements of a selective reflective polarizer in the visible region.

Referring now to FIG. 5, a diagram of the spectrum measurements of a selective reflective polarizer in the visible region is shown. The diagram displays the extinction coefficients (the transmission of p state polarization over the transmission of s state polarization) for different wavelength values. The average extinction coefficient is 3, or 75% over 25%.

Figure 6:
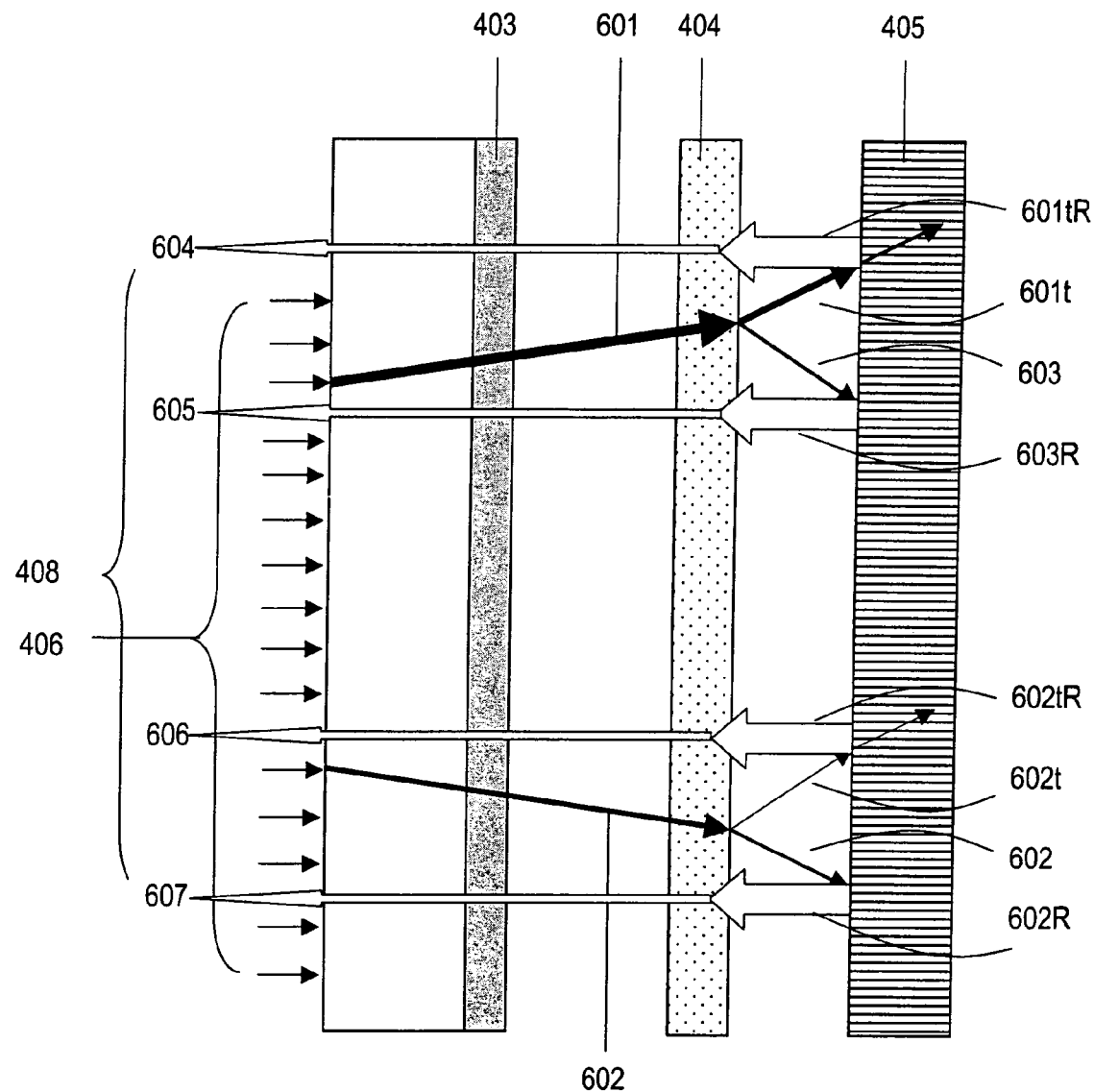
FIG. 6 is a diagram of the propagations of the reflective lights through the diffusing transflector.

With reference to FIG. 6, a diagram of the propagations of the reflective lights through the diffusing transflector is shown. The light 406 entering the LCD consists mainly of transmissive p polarization 601 and also has s polarization 602. The p polarization and s polarization components are slightly randomized when they pass the diffusing element 404. The p polarization 601 yields mainly p polarization 601*t* and also has s polarization 603. When 601*t* reaches the reflective surface 405 (with extinction coefficient 3.0), approximately 25% reflects as reflective illumination 601*t*R.

When s polarization 603 reaches the reflective surface of 405, approximately 75% reflects as reflective illumination 603R. By the similar propagation mechanisms, reflective illuminations 602*t*R and 602R are produced by s polarization 602. The transmissions of the reflected beams 604, 605, 606, and 607, additively generate the total reflective illumination 408. Under a very strong ambient light, the reflective illumination 408 is sufficient to overcome the front surface background reflection 415 (FIG. 4), and to facilitate the viewing of the images under the most challenging conditions.

Figure 7:
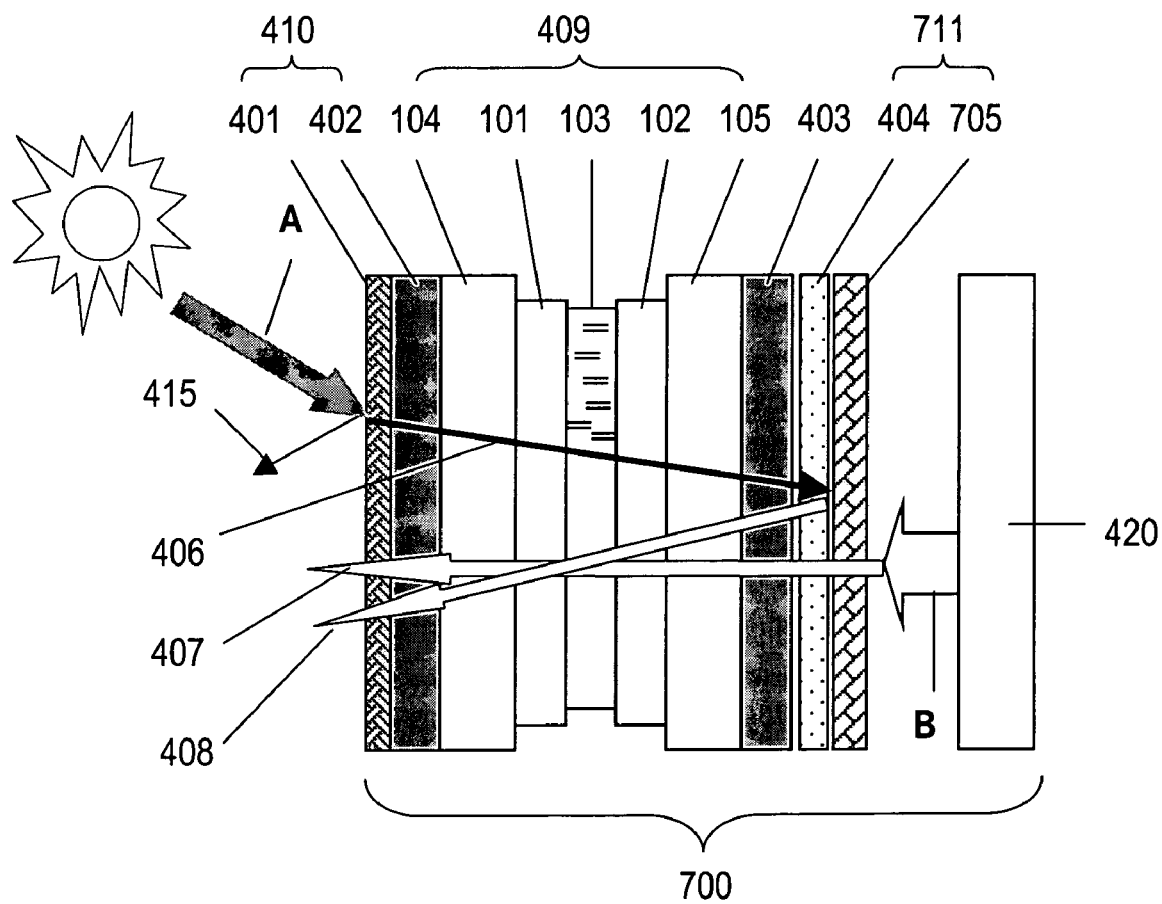
FIG. 7 is a diagram of an alternative embodiment of the present invention.

Referring now to FIG. 7, an illustration of an alternative embodiment of the present invention is shown. The transflective LCD 700 comprises a conventional liquid crystal display panel 409. The transflective LCD 700 further comprises a low reflection first polarizer 410. The rear side of low reflection first polarizer 410 is bonded to the front side of LCD panel 409 using optical bonding material. The low reflection first polarizer 410 is composed of an anti-reflection (AR) layer 401 and a dichroic polarizer 402. The anti-reflection layer 401 can be a high efficiency multi-layer anti-reflection coating applied directly on the front surface of the dichroic polarizer 402. The anti-reflection layer 401 can also be a separate transmissive substrate, glass or plastic, with an AR coating on the front side. The rear side of the transmissive substrate is bonded to the front side of dichroic polarizer 402 with an index-matched optical bonding material to lower the reflection. The low reflection front surface 401 preferably is a low haze surface (less than 15% haze) with high efficient multi-layer AR coating, which provides an anti-reflection efficiency of less than 1%. The low reflection front surface 401 produces less background reflection 415 than the regular LCD front surface 106 described in FIG. 1 (by 5 to 8 folds). In addition, the low reflection surface 401 allows more efficient transmission of ambient light A and provides a stronger light beam 406 to be used as the reflective illumination 408. The transflective LCD 700 also includes a second dichroic polarizer 403 optically bonded to the rear of liquid crystal panel 409. In this embodiment, the transmission directions of the two dichroic polarizers 402 and 403 are preferably in parallel. Such an arrangement of 402 and 403 provides a transflective LCD that is direct sunlight readable without backlight. However, the transmission directions of 402 and 403 can also vary from 0 to 90 degrees. It is also preferred that AR coating is applied to the rear surface of the rear dichroic polarizer 403 (not shown). The AR coating maximizes entry of light beam 406 for reflective illumination.

Still referring to FIG. 7, the transflective LCD 700 further comprises a diffusing transflector 711 positioned to the rear side of second dichroic polarizer 403. The diffusing transflector 711 is composed of a diffusing element 404 and a selective beam splitter 705. The transmission of the beam splitter 705 ranges from 30% to 85%. It is preferred the beam splitter 705 is a multi-layer coating of dielectric material directly deposited to the rear surface of the diffusing element 404. However, the beam splitter 705 can also be a multi-layer dielectric coating deposited on the front surface of a transmissive substrate. The coated transmissive separate substrate is positioned on the rear side of diffusing element 404.

With reference to FIG. 7, the diffusing element 404 preferably has a corrugated surface with haze in the range of 10% to 85%. The corrugated surface can be a roughened surface on a transmissive polymeric substrate, such as PEN (polyethylene naphthalate), PC (polycarbonate), or PET (polyethylene erephthalate). The corrugated surface also can be a dielectric material, such as TiO2 (Titanium dioxide), Ta2O5 (Tantalum oxide), SiO2 (Silicon dioxide), SiN (Silicon nitride), ITO (Indium tin oxide), ZnS (Zinc sulphide), Al2O3 (Aluminum oxide), LaF3 (Lanthanum fluoride), MgF2 (Magnesium fluoride), Ge (Germanium) or Si (Silicon) deposited on a transmissive substrate. The corrugated surface can further be small metal particles, ranging in size from 10 nm to 10000 nm, deposited directly on the rear side of the second polarizer or on a separate transmissive substrate. Choices of metal include silver, gold, aluminum, copper, titanium, tantalum, chromium, nickel or an alloy thereof. One or more sheets of lose-packed or optically bonded transmissive substrate with the corrugated surface can make up the diffusing element 404. Diffusing element 404 can be optically bonded to the front surface of the beam splitter 705, provided the beam splitter 705 is a separate substrate, as described above, to form the diffusing transflector 711, which can be optically bonded to the rear side of the second dichroic polarizer 403, as shown, or the front side of the second dichroic polarizer 403, not shown.

Still referring to FIG. 7, the transflective LCD 700 further includes a high efficiency backlight cell assembly 420. Backlight assembly 420 preferably contains one or two orthogonal sheets of brightness enhancement films and other multiple polymeric films for enhancing transmission and optical performances. However, any conventional backlight cell or high bright backlight cell, with edge lamps or backside lamps, can be used.

Commercial TFT LCDs of various sizes and structures can easily be modified in accordance with the teachings of the present invention to generate LCDs viewable under direct sunlight. Optimal viewing performances are obtained by adjusting proper orientations of the diffusing element and the reflective polarizer according to the polarization transmission characteristics of the existing liquid crystal display panel. The following examples illustrate how different commercial TFT LCDs can be modified in accordance with the teachings of the present invention to generate transflective LCDs.

EXAMPLE 1

A Direct Sunlight Readable 15" TFT LCD

Figure 8:
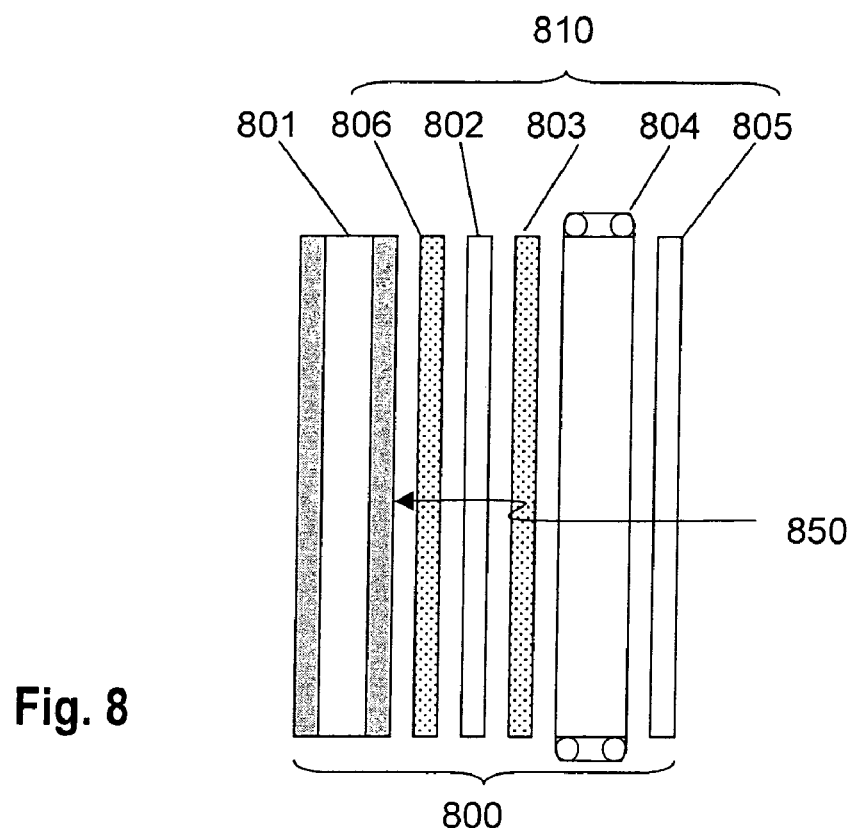
FIG. 8 is a diagram of the structure of a 15" desktop monitor TFT LCD (related art).

Referring now to FIG. 8, a diagram of the structure of a 15" desktop monitor Thin Film Transistor Liquid Crystal Display (TFT LCD) is shown (related art). The LCD 800 comprises a display unit 801 with a liquid crystal panel sandwiched between a pair of dichroic polarizers. The dichroic polarizers have off-axis transmission directions. The backlight cell 810 includes a diffusive reflector 805, a wave guide plate with four lamps 804, a rear diffuser 803 positioned in front of wave guide plate 804, a sheet of brightness enhancement film 802 positioned in the front side of rear diffuser 803 and a front diffuser 806 positioned in front of the brightness enhancement film 802. The TFT LCD illuminates about 250 to 275 nits. The display performs nicely indoors but visibility diminishes when the display moves outdoors. The image is totally invisible when the display is positioned towards direct sunlight.

Figure 9:
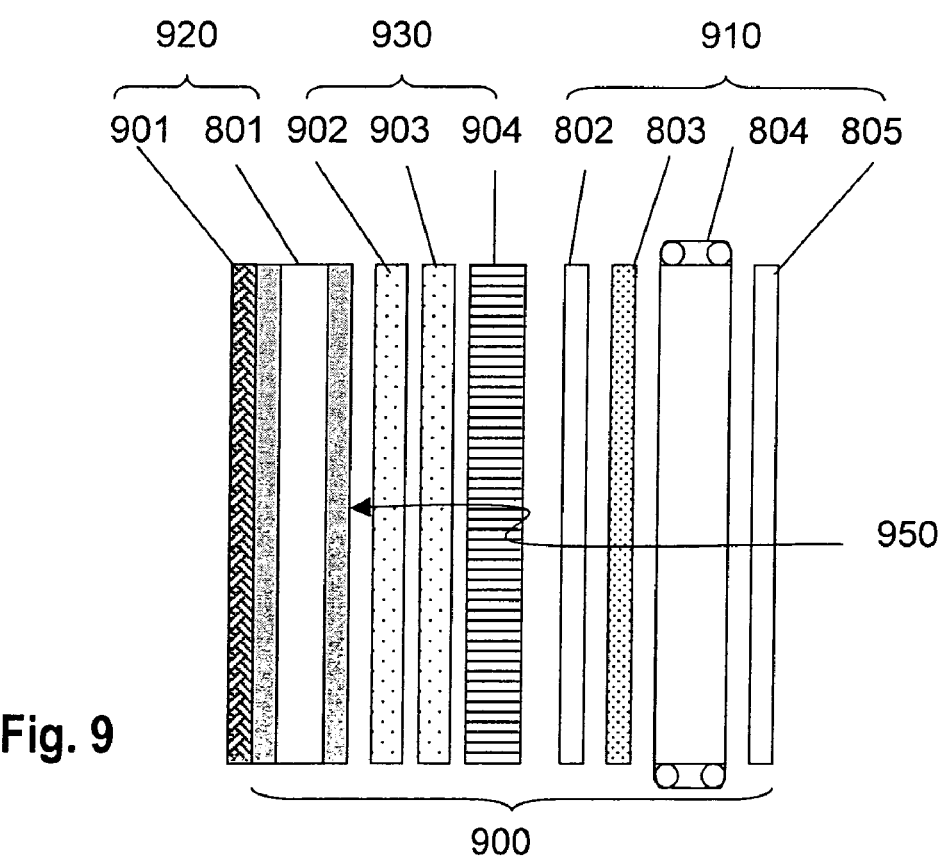
FIG. 9 is a diagram of an embodiment of the present invention modifying a 15" desktop monitor TFT LCD.

With reference to FIG. 9, a diagram of an embodiment of the present invention modifying the 15" desktop monitor TFT LCD 800 is shown. The transflective TFT LCD 900 constructed in accordance to the present invention includes the major components of the low reflection liquid crystal display unit 920, the diffusing transflector 930, and the high efficient backlight cell 910. Applying an anti-reflection coating 901 on the front surface of 801 generates the low reflection display unit 920, preferably with less than 15% haze and an anti-reflection efficiency less than 1%. The anti-reflection coating 1801 is a plastic film bound to the front surface 1701. The diffusing transflector 930 comprises a sheet of diffuser, 902, and a diffuser laminated selective reflective polarizer 903. This diffusing transflector 930 is positioned on the rear side of the display unit 920 in accordance to the teaching of the present invention. The transflective LCD 900 has an enhanced transmissive illumination between 350 and 400 nits. Indoor and outdoor performance is greatly enhanced without altering the viewing angle or resolution. Under direct sunlight, the transflective illumination effectively dominates the lighting of the display and renders the display images viewable.

Figure 10:
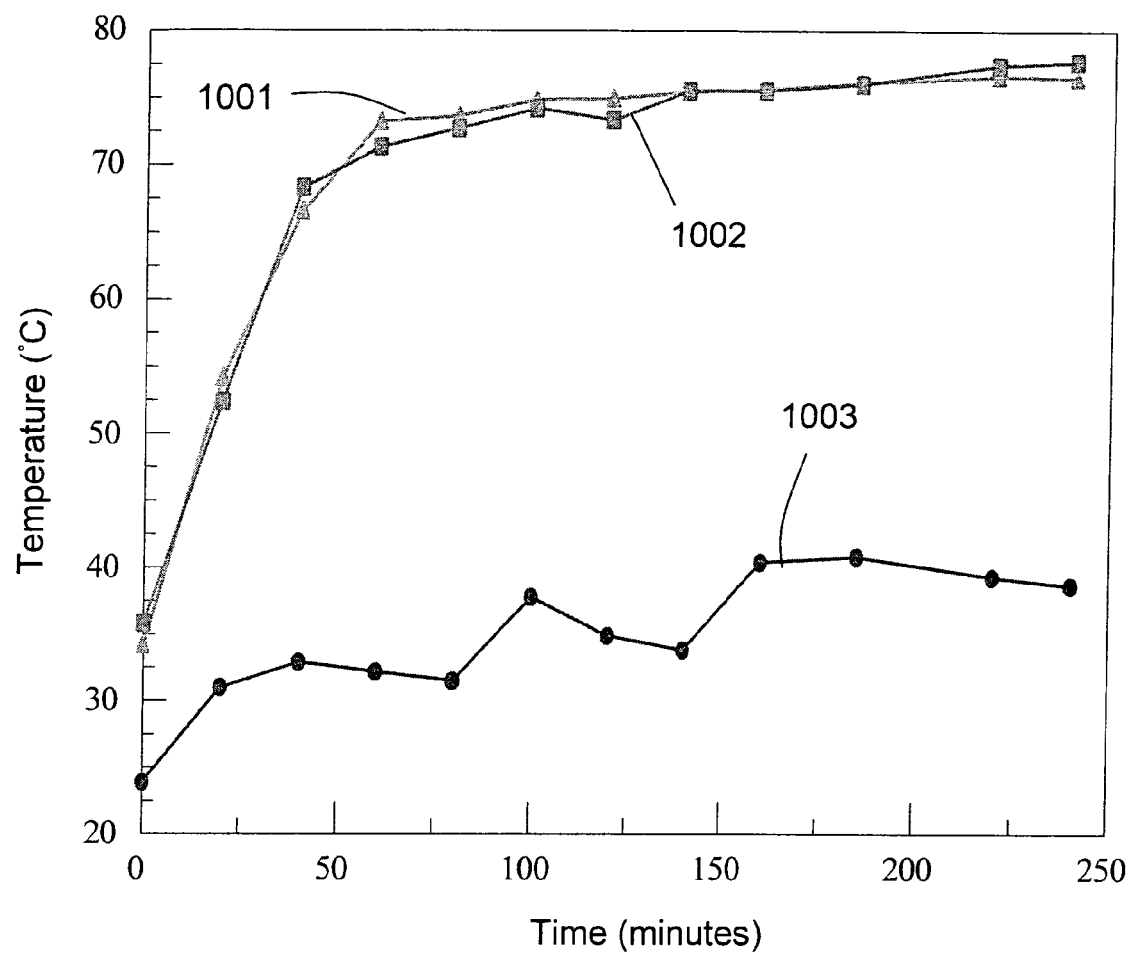
FIG. 10 is a diagram of a comparison of temperature measurements between the monitor of FIG. 8 and the monitor of FIG. 9.

Referring now to FIG. 10, a diagram of a comparison of temperature measurements between the regular LCD 800 and the modified LCD 900 is shown. Thermal couples are adhered to the center of the rear side of the display units in 800 and 900, as shown by 850 and 950 in FIG. 8 and FIG. 9, respectively. The displays were provided with the same operating conditions and voltage supplies. Curve 1003 shows the outdoor air temperatures ranging from 30° C. to 40° C. Curve 1001 shows the temperature measurements of the transflective LCD 900, and curve 1002 shows the temperature measurements of the regular LCD 800. Both regular LCD 800 and transflective LCD 900 reach an equilibrium operating temperature between 76° C. and 78° C. The transflective LCD 900 does not generate any excessive heat in the system when compared to the regular LCD 800.

EXAMPLE 2

A Direct Sunlight Readable 14.2" Notebook Computer TFT LCD

Figure 11:
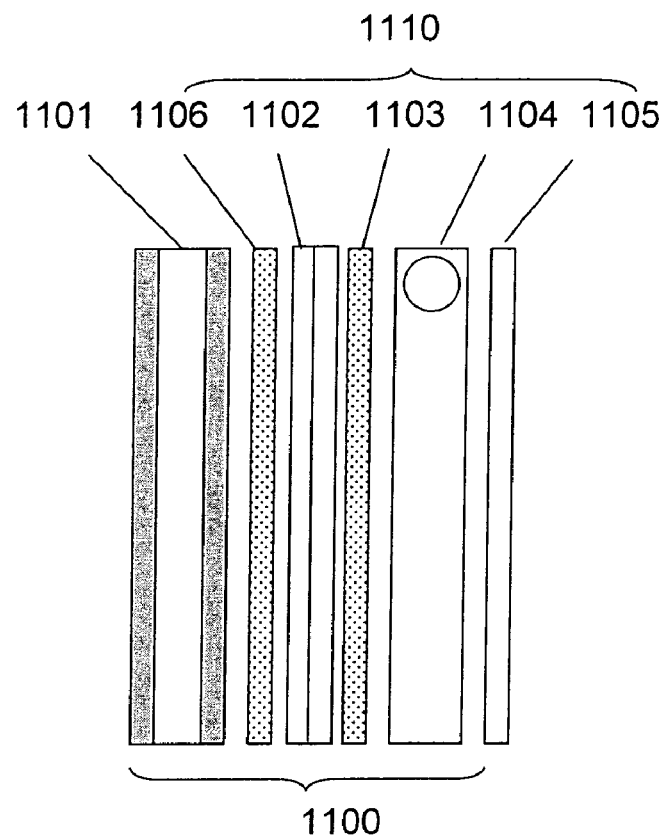
FIG. 11 is a diagram of the structure of a 14.2" notebook computer TFT LCD (related art).

With reference to FIG. 11, a diagram of the structure of a 14.2" notebook computer TFT LCD is shown (related art). The LCD 1100 comprises a display unit 1101 with a liquid crystal panel sandwiched between a pair of dichroic polarizers with parallel transmission directions. The backlight cell 1110 is composed of a diffusely reflector 1105, a wave guide plate coupled with one lamp 1104, a sheet of diffuser 1103 positioned on the front side of wave guide plate 1104, two sheets of brightness enhancement film 1102 positioned in the front side of diffuser 1103, and another diffuser 1106 in front of enhancement film 1102. The above described unit illuminates between 120 and 140 nits. The display performs well indoors but is very difficult to view under any outdoors conditions.

Figure 12:
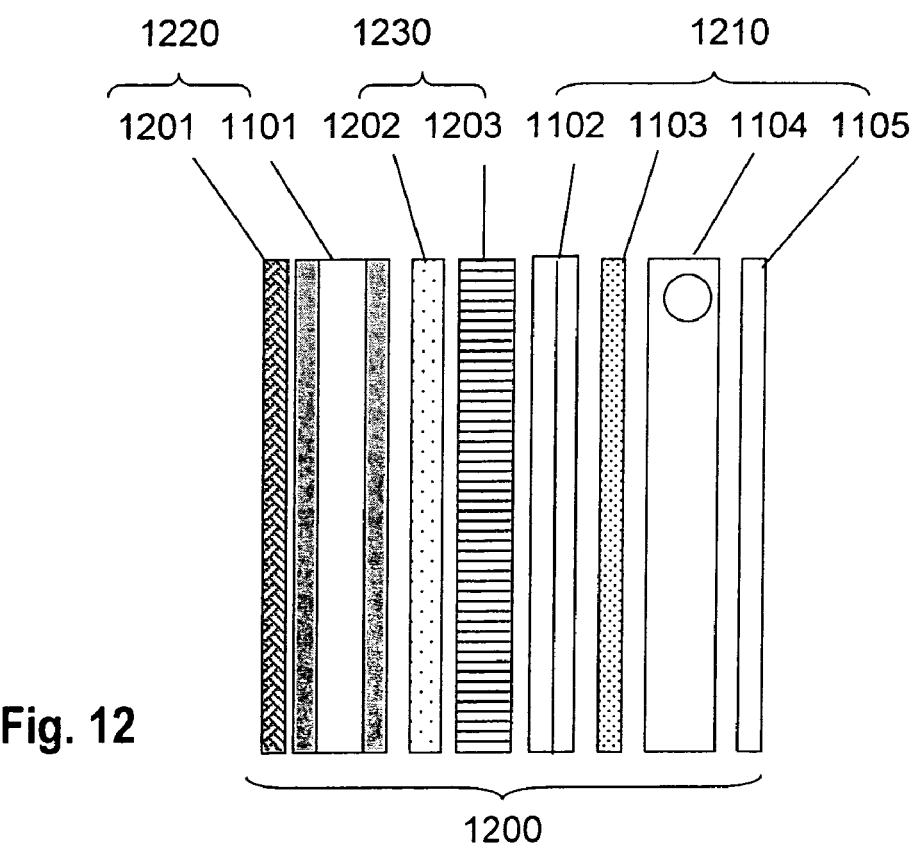
FIG. 12 is a diagram of an embodiment of the present invention modifying a 14.2" notebook computer TFT LCD.

Referring now to FIG. 12, a diagram of an embodiment of the present invention modifying the 14.2" notebook computer TFT LCD 1100 is shown. The transflective TFT LCD 1200 comprises the major components of the low reflection liquid crystal display unit 1220, the diffusing transflector 1230, and the high efficient backlight cell 1210. Applying an anti-reflection coating 1201 on the front surface of 1101 generates the low reflection liquid crystal display unit 1220, preferably with less than 15% haze and an anti-reflection efficiency less than 1%. The anti-reflection coating 1801 is a plastic film bound to the front surface 1701. The diffusing transflector 1230 is composed of one sheet of diffuser 1202 and a reflective polarizer 1203. This diffusing transflector 1230 is positioned on the rear side of the display unit 1220 in accordance to the teaching of the present invention. The transflective LCD 1200 has an enhanced transmissive illumination of between 175 and 185 nits, yielding better indoor performances. In addition, the display is visible under all outdoor lighting conditions including direct sunlight regardless of its transmissive illumination.

EXAMPLE 3

A Direct Sunlight Readable 10.4" Tablet TFT LCD

Figure 13:
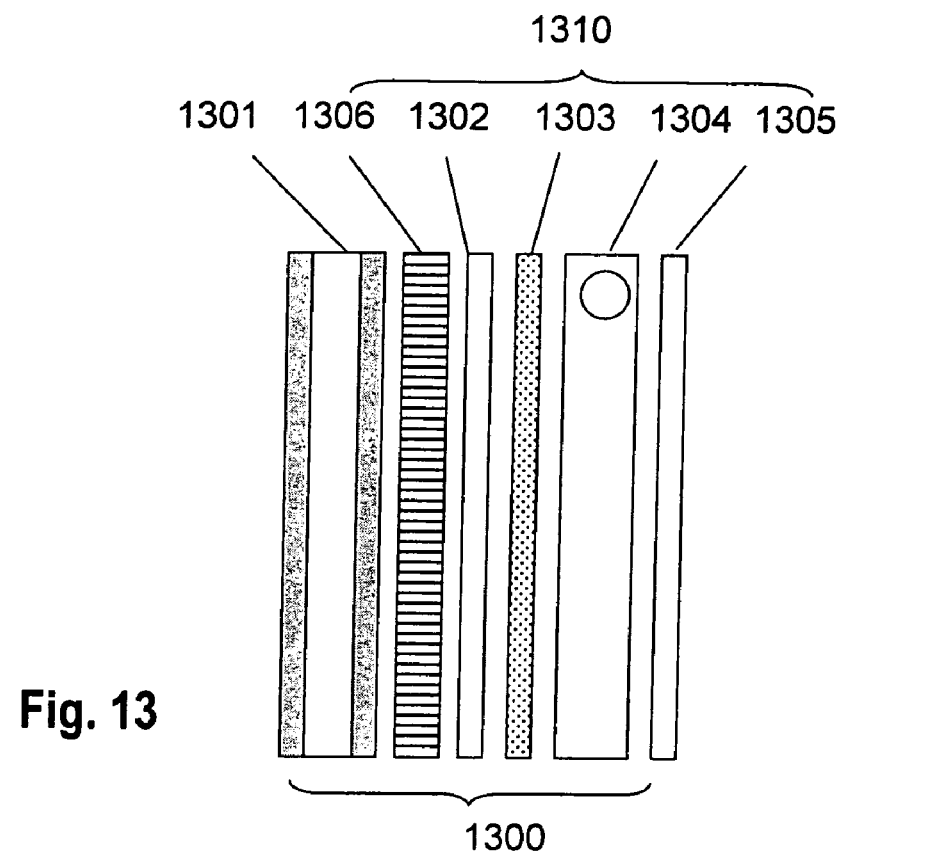
FIG. 13 is a diagram of the structure of a 10.4" Tablet TFT LCD (related art).

With reference to FIG. 13, a diagram of the structure of a 10.4" Tablet TFT LCD is shown (related art). The LCD 1300 comprises a display unit 1301 with a liquid crystal panel sandwiched between a pair of dichroic polarizers with parallel transmission directions. The backlight cell 1310 is composed of a diffusive reflector 1305, a wave guide plate coupled with one edge lamp 1304, a sheet of diffuser 1303 positioned in the front side of wave guide plate 1304, a sheet of brightness enhancement film 1302 positioned in front of diffuser 1303, and a reflective polarizer 1306 in front of enhancement film 1302. The above described unit illuminates approximately 200 nits. The display gives good optical performances indoors, yet is very difficult to view under any outdoor conditions.

Figure 14:
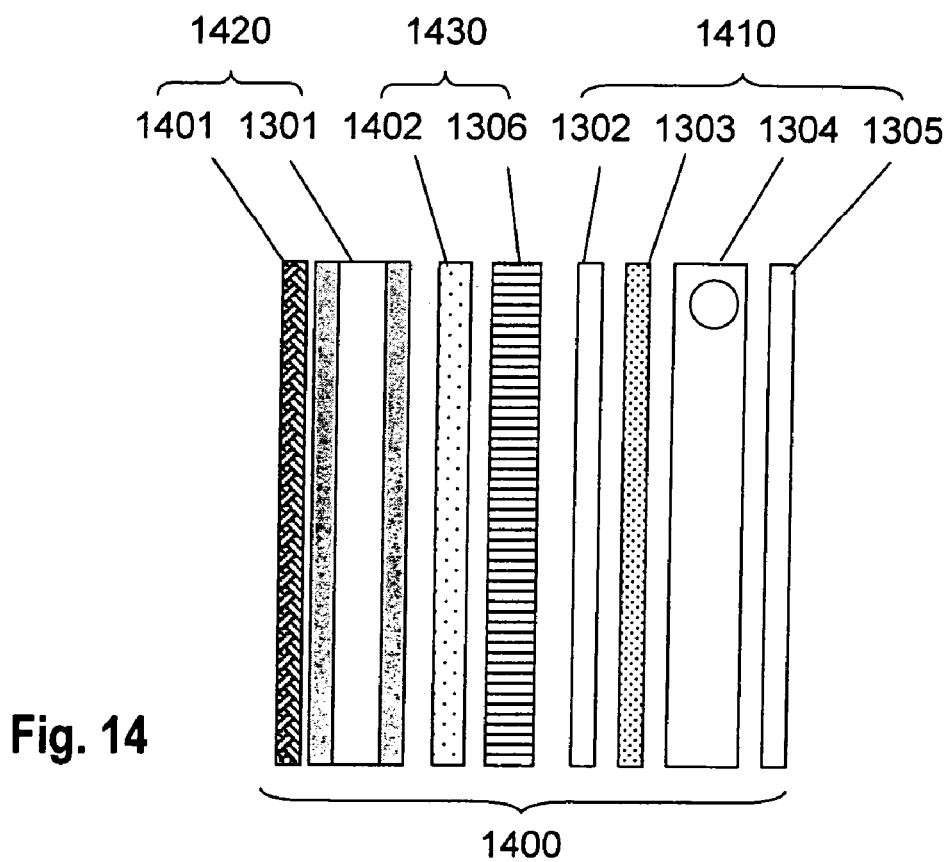
FIG. 14 is a diagram of an embodiment of the present invention modifying a 10.4" Tablet TFT LCD.

With reference to FIG. 14, a diagram of an embodiment of the present invention modifying the 10.4" Tablet TFT LCD 1300 is shown. The transflective TFT LCD 1400 includes the major components of the low reflection liquid crystal display unit 1420, the diffusing transflector 1430, and the high efficient backlight cell 1410. Applying an anti-reflection coating 1401 on the front surface of 1301 generates the low reflection liquid crystal display unit 1420, preferably with less than 15% haze and an anti-reflection efficiency less than 1%. The anti-reflection coating 1401 is a plastic film bound to the front surface 1301. The diffusing transflector 1430 is composed of one sheet of diffuser 1402 and a reflective polarizer 1306. The diffusing transflector 1430 is positioned on the rear side of the display unit 1420 in accordance to the teaching in the present invention. The transflective LCD 1400 has about the same transmissive illumination as LCD 1300 and is visible under all outdoor lighting conditions, including direct sunlight.

EXAMPLE 4

A Direct Sunlight Readable Open Frame 12.1" TFT LCD

Figure 15:
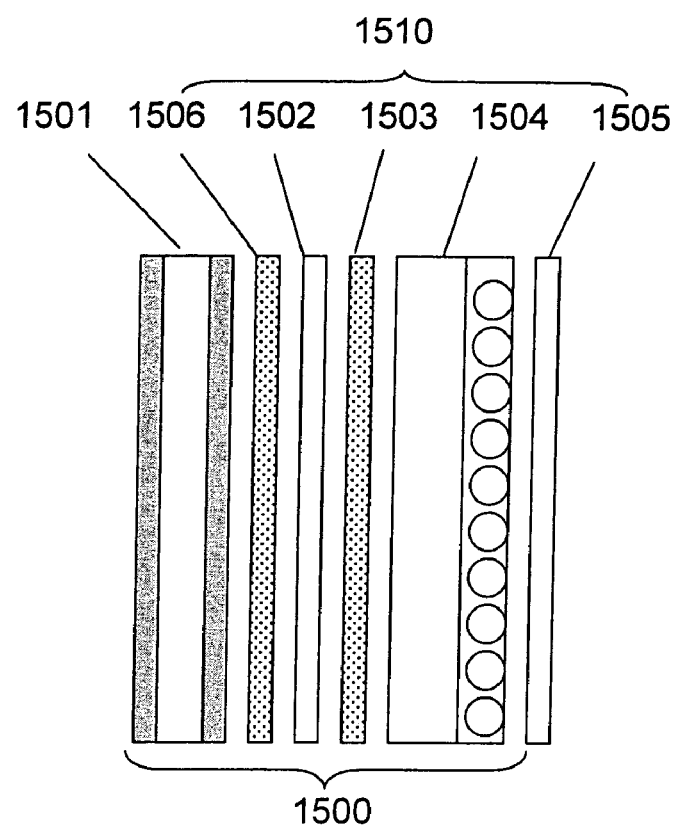
FIG. 15 is a diagram of the structure of a 12.1" open frame high bright TFT LCD (related art).

With reference to FIG. 15, a diagram of the structure of a 12.1" open frame high bright TFT LCD is shown (related art). The LCD 1500 comprises a display unit 1501 with a liquid crystal panel sandwiched between a pair of dichroic polarizers with off-axis transmission directions. The backlight cell 1510 comprises a diffusive reflector 1505, a wave guide plate with ten back side lamps 1504, a sheet of diffuser 1503 positioned in the front side of wave guide plate 1504, a sheet of brightness enhancement film 1502 positioned in front of diffuser 1503, and another diffuser 1506 in front of enhancement film 1502. The above-described unit illuminates approximately 700 to 800 nits. The display gives very good optical performances indoor with partial transmission illumination. With full transmission illumination (i.e. 800 nits), the display provides good visibilities under moderate ambient light. However, the display generates excessive heat and therefore reaches its clearing temperature in approximately 30 minutes, a short amount of time. Upon reaching its clearing temperature, the display turns black. Under very strong ambient light or direct sunlight, the display is difficult to view even when provided with full transmission illumination provided by its backlight.

Figure 16:
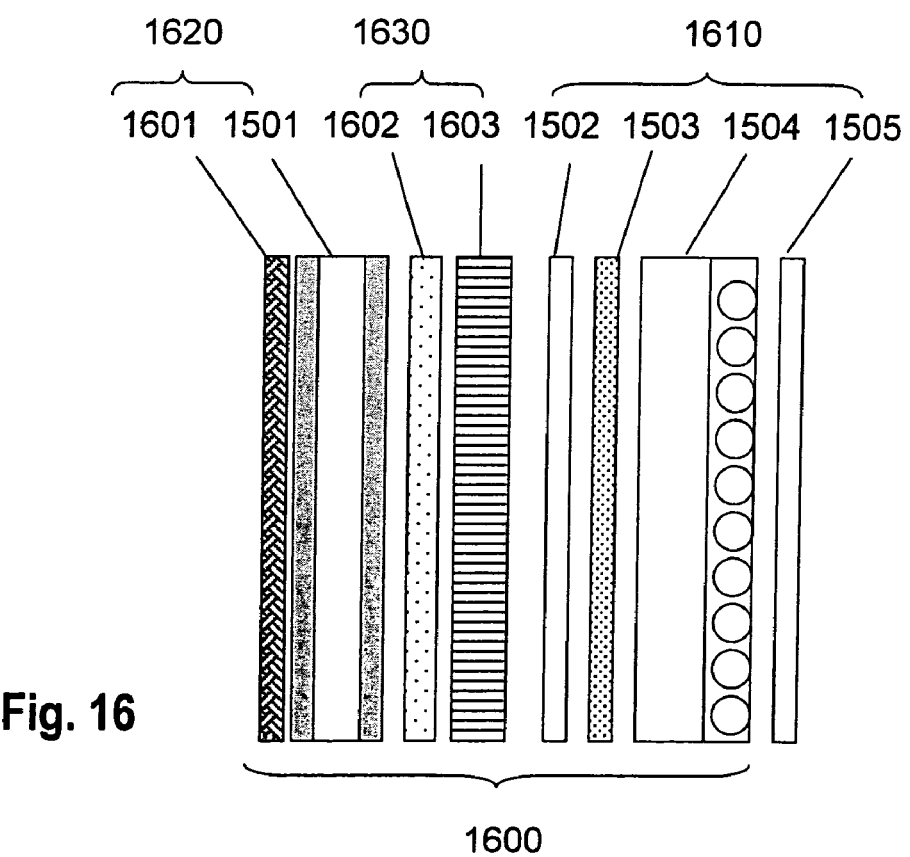
FIG. 16 is a diagram of an embodiment of the present invention modifying a 12.1" open frame high bright TFT LCD.

With reference to FIG. 16, a diagram of an embodiment of the present invention modifying the 12.1" open frame high bright TFT LCD 1500 is shown. The transflective TFT LCD 1600 comprises the major components of the low reflection liquid crystal display unit 1620, the diffusing transflector 1630, and the high efficient backlight cell 1610. Applying an anti-reflection coating 1601 on the front surface of 1501 generates the low reflection liquid crystal display unit 1620, preferably with less than 15% haze and an anti-reflection efficiency less than 1%. The anti-reflection coating 1601 is a plastic film bound to the front surface 1501. The diffusing transflector 1630 is composed of one sheet of diffuser 1602 and a reflective polarizer 1603. This diffusing transflector 1630 is positioned on the rear side of the display unit 1620 in accordance to the teaching of the present invention. The transflective LCD 1600 has approximately the same transmissive illumination as 1500, yielding the same satisfactory indoor performances. Unlike TFT LCD 1500, however, transflective TFT LCD 1600 is visible under all outdoor lighting conditions, including direct sunlight, regardless of the amount of transmissive illumination.

EXAMPLE 5

A Direct Sunlight Readable 1.5" TFT LCD

Figure 17:
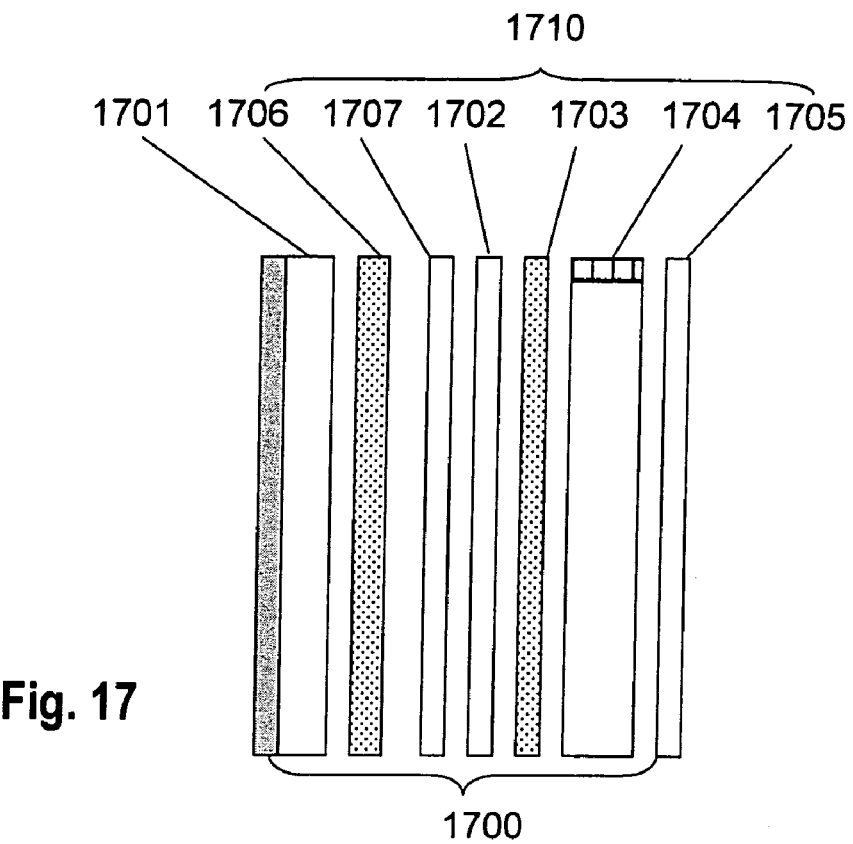
FIG. 17 is a diagram of the structure of a 1.5" TFT LCD (related art).

With reference to FIG. 17, a diagram of the structure of a 1.5" TFT LCD is shown (related art). A 1.5" TFT LCD is commonly used as a monitor on a digital camera. The LCD 1700 comprises a display unit 1701 with a liquid crystal cell, a first dichroic polarizer, and a circular polarization-generating element (not shown). The backlight cell 1710 comprises a diffusely reflector 1705, a wave guide plate with four edge LED 1704, a sheet of diffuser 1703 positioned in the front side of wave guide plate 1705, two sheets of brightness enhancement film 1702 and 1707 positioned in front of diffuser 1703, and another diffuser 1706 in front of the brightness enhancement film sheets 1702 and 1707. The above-described unit illuminates approximately 150 to 200 nits in the camera system. The display gives moderate optical performances indoor, and is very difficult to view under any outdoor conditions.

Figure 18:
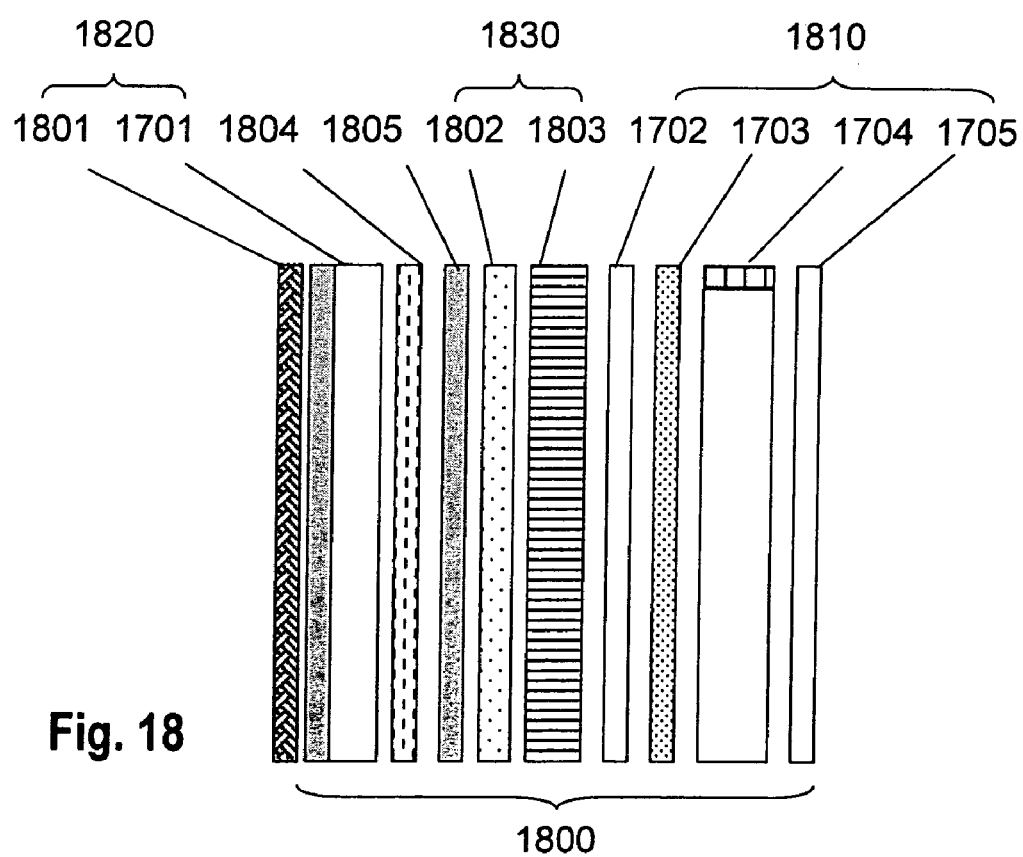
FIG. 18 is a diagram of an embodiment of the present invention modifying a 1.5" TFT LCD.

With reference to FIG. 18, a diagram of an embodiment of the present invention modifying the 1.5" TFT LCD 1700 is shown. The transflective TFT LCD 1800 comprises the major components of the low reflection liquid crystal display unit 1820, the diffusing transflector 1830, and the high efficient backlight cell 1810. Applying an anti-reflection coating 1801 on the front surface of 1701 generates the low reflection liquid crystal display unit 1820, preferably with less than 15% haze and an anti-reflection efficiency less than 1%. The anti-reflection coating 1801 is a plastic film bound to the front surface 1701. A quarter wave plate 1804 is positioned on the rear of the display unit 1820 to generate a linear polarization from the circular polarization output of the display unit 1820. The second dichroic polarizer 1805 is then placed at the rear side of the quarter wave plate 1804. The transmission direction for the second dichroic polarizer 1805 is parallel to the direction of the linear polarization output of the quarter wave plate 1804. The diffusing transflector 1830 is composed of one sheet of diffuser 1802 and a reflective polarizer 1803. This diffusing transflector 1830 is positioned on the rear side of the dichroic polarizer 1805 in accordance to the teaching in the present invention. The transflective LCD 1800 has less transmission illumination than TFT LCD 1700, with values between 100 nits and 150 nits. However, the display 1800 is more visible under all lighting conditions, including direct sunlight, due to its transflective property and enhanced contrast.

In summary, the present invention resolves and considers the reflection and transmission properties of the transflector to provide a transflective LCD with optical properties tailored for indoor and outdoor applications. A high efficiency multi-layer anti-reflection coating (AR coating) not only reduces the background reflection of the LCD front surface, but also allows the liquid crystal display unit to transmit more energy of incident light, thus providing more reflective illumination. Before, incident light was partially reflected on the surface of the substrate. With the present invention, the low reflection and high transmission properties of the AR coating and the diffusing transflector cooperatively provide the display with optimal illuminations.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method of making an LCD viewable under all lighting condition from an LCD having a liquid crystal cell positioned between a first dichroic polarizer and a second dichroic polarizer, and a backlight assembly positioned behind the second dichroic polarizer, the method comprising the steps of:
    (a) positioning an anti-reflection layer with a surface of haze value less than 15% in front of the first dichroic polarizer; and
    (b) positioning a diffusing transflector between the backlight assembly and the second dichroic polarizer, the diffusing transflector comprising a diffusing element and a reflective polarizer, the diffusing element being a transparent substrate layer or a corrugated surface having a haze value of 10% to 85%, and the reflective polarizer being positioned with its transmission direction forming an angle of 0 degree, between 0 and 60 degrees, or between −60 and 0 degrees to the transmission direction of the second dichroic polarizer.

2. A method of making an LCD viewable under all lighting condition from an LCD having a liquid crystal cell positioned between a first dichroic polarizer and a second dichroic polarizer, a backlight assembly positioned behind the second dichroic polarizer, and a reflective polarizer positioned between the backlight assembly and the second dichroic polarizer with its transmission direction forming an angle of 0 degree, between 0 and 60 degrees, or between −60 and 0 degrees to the transmission direction of the second dichroic polarizer, the method comprising the steps of:
    (a) positioning an anti-reflection layer with a surface of haze value less than 15% in front of the first dichroic polarizer; and
    (b) positioning a diffusing element between the second dichroic polarizer and the reflective polarizer, the diffusing element being a transparent substrate layer or a corrugated surface having a haze value of 10% to 85%.

3. A method of making an LCD viewable under all lighting condition from an LCD having a liquid crystal cell positioned between a first dichroic polarizer and a second dichroic polarizer, a backlight assembly positioned behind the second dichroic polarizer, and a diffusing transflector positioned between the backlight assembly and the second dichroic polarizer, the diffusing transflector comprising a diffusing element and a reflective polarizer, the diffusing element being a transparent substrate layer or a corrugated surface having a haze value of 10% to 85%, and the reflective polarizer having its transmission direction forming an angle of 0 degree, between 0 and 60 degrees, or between −60 and 0 degrees to the transmission direction of the second dichroic polarizer, the method comprising the step of positioning an anti-reflection layer with a surface of haze value less than 15% in front of the first dichroic polarizer.

4. A method of making an LCD viewable under all lighting condition from an LCD having a liquid crystal cell positioned between a first dichroic polarizer with anti-reflection treatment and surface haze less than 15% and a second dichroic polarizer, a backlight assembly positioned behind the second dichroic polarizer, the method comprising the step of: positioning a diffusing transflector between the backlight assembly and the second dichroic polarizer, the diffusing transflector comprising a diffusing element and a reflective polarizer, the diffusing element being a transparent substrate layer or a corrugated surface having a haze value of 10% to 85%, and the reflective polarizer being positioned with its transmission direction forming an angle of 0 degree, between 0 and 60 degrees, or between −60 and 0 degrees to the transmission direction of the second dichroic polarizer.

5. A method of making an LCD viewable under all lighting condition from an LCD having a liquid crystal cell positioned between a first dichroic polarizer and a second dichroic polarizer, a backlight assembly positioned behind the second dichroic, polarizer, and a diffusing element being a transparent substrate layer or a corrugated surface having a haze value of 10% to 85% in front of the backlight assembly, the method comprising the steps of:
    (a) positioning an anti-reflection layer with a surface of haze value less than 15% in front of the first dichroic polarizer; and
    (b) positioning a transflector between the backlight assembly and the diffusing element, the transflector being a reflective polarizer positioned such that its transmission direction forms an angle of 0 degree, between 0 and 60 degrees, or between −60 and 0 degrees to the transmission direction of the second dichroic polarizer.

6. A method of making an LCD viewable under all lighting condition from an LCD having a liquid crystal cell positioned between a first dichroic polarizer with anti-reflection treatment and surface haze less than 15% and a second dichroic polarizer, a backlight assembly positioned behind the second dichroic polarizer, and a reflective polarizer positioned between the second dichroic polarizer and the backlight assembly with its transmission direction forming an angle of 0 degree, between 0 and 60 degrees, or between −60 and 0 degrees to the transmission direction of the second dichroic polarizer, the method comprising the step of: positioning a diffusing element between the second dichroic polarizer and the reflective polarizer, the diffusing element being a transparent substrate layer or a corrugated surface having a haze value of 10% to 85%.

* * * * *